Figure 3:
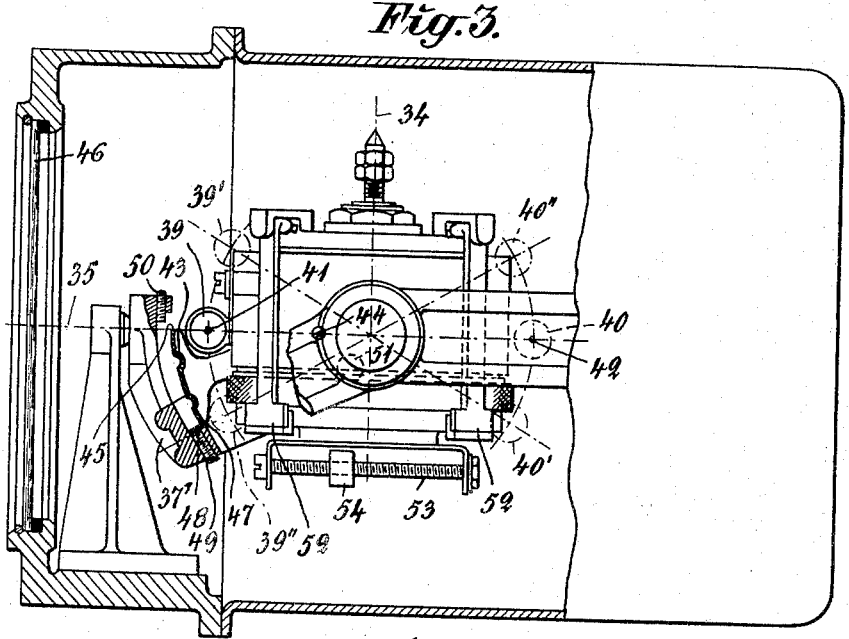

July 24, 1951 S. G. SVENSSON ET AL 2,561,713
GYRO HORIZON WITH OPTICAL HORIZON INDICATOR
Filed July 3, 1945 2 Sheets-Sheet 1
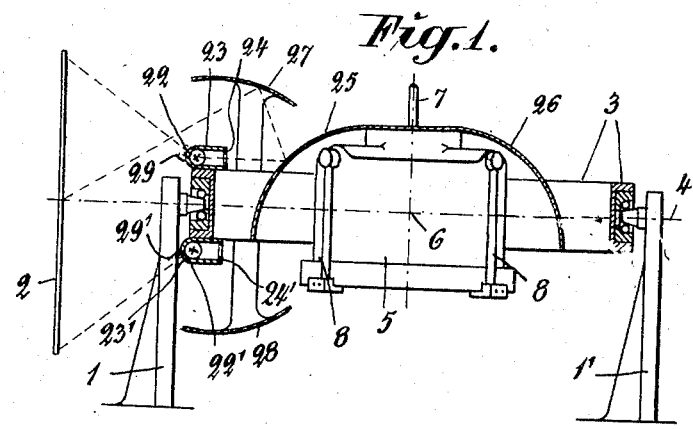
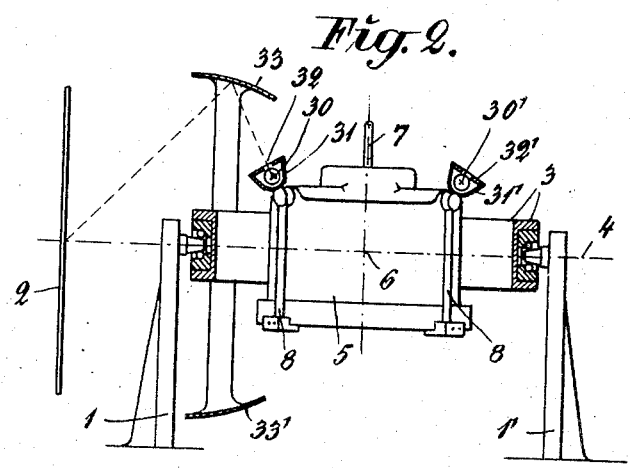

Patented July 24, 1951

UNITED STATES PATENT OFFICE 2,561,713

GYRO HORIZON WITH OPTICAL HORIZON INDICATOR

Sven Gunnar Svensson, Sundbyberg, Rolf Bertil Person, Stockholm, and Nils Börje Langefors, Sundbyberg, Sweden, assignors to Aktiebolaget Nordiska Armaturfabrikerna, Linkoping, Sweden Application July 3, 1945, Serial No. 602,962
In Sweden December 23, 1943

7 Claims. (Cl. 33—204)

This invention relates to gyro horizons for aircraft and more particularly to a gyro horizon which does not require to be caged regardless of the maneuvers undertaken by the aircraft.

The previously known types of gyro-horizons for airplanes have to be caged before the accomplishment of certain maneuvers of the airplane in order that they will indicate correctly again after the maneuver is completed. This caging operation has proved to be of considerable disadvantage, particularly in fighter planes, where the pilot may get into a situation, in which it is impossible for him to undertake such a caging operation. Therefore, a generally useful gyro-horizon must be so built that after any maneuver of the airplane it will still show, without caging, a correct indication whenever the inclination of the longitudinal axis of the airplane with respect to the horizontal plane is again below a certain limit value, for instance ±45°.

For effecting this it is not sufficient that the two Cardan rings be able to make an unlimited number of revolutions, as will be understood from the following example. A known type of gyro horizon is so arranged that the outer and inner Cardan rings can freely revolve an unlimited number of revolutions, whereby the inner Cardan ring, which is constituted as a rotor housing, is provided with an eccentrically arranged circular disc, which is in operative connection with a lever coupled to an indication member. The centre of this guiding disc is located at the side of the axis of the inner Cardan ring and more precisely at the same side as the turning axis of the lever.

If now an airplane provided with such a gyro horizon makes a turn of 180° about its transverse axis, i. e. is flying on its back, and then turns 180° about its longitudinal axis, i. e. makes half a roll, then the centre of the guiding disc and the turning axis of the lever will afterwards be located at different sides of the axis of the inner Cardan ring, whereby at the same time the length of the lever has become changed. Thus, after these two maneuvers the instrument will show wrong angles of deviations with respect to size and direction.

The object of the invention is to provide a gyro horizon which, after any maneuver of the airplane has been accomplished, particularly as mentioned above, will still show a correct indication even though not caged before the maneuver is begun. According to this invention a gyro horizon is provided in which the indication of horizon is effected by means of an optical arrangement.

Broadly stated, this optical arrangement consists of a visor disc fixed to an instrument stand and means to establish a light path from a light source onto the visor disc. The means to establish a light path comprises a system of light sources and mirrors which are supported from the inner and outer Cardan rings so as to define in coaction a light path from a source located on one ring to a mirror located on the other ring to the visor disc. The rings which are equipped with mirrors have them on both sides of the ring axis and the rings which have light sources thereon have light sources on both sides of the ring axis. In this way if either ring of the gyroscope turns 180° around its axis in the course of an aircraft maneuver there is still available a light or mirror, as the case may be, so that the instrument can project light onto the disc.

In the drawing there are illustrated several embodiments of the gyro horizon according to the invention.

Figure 4:
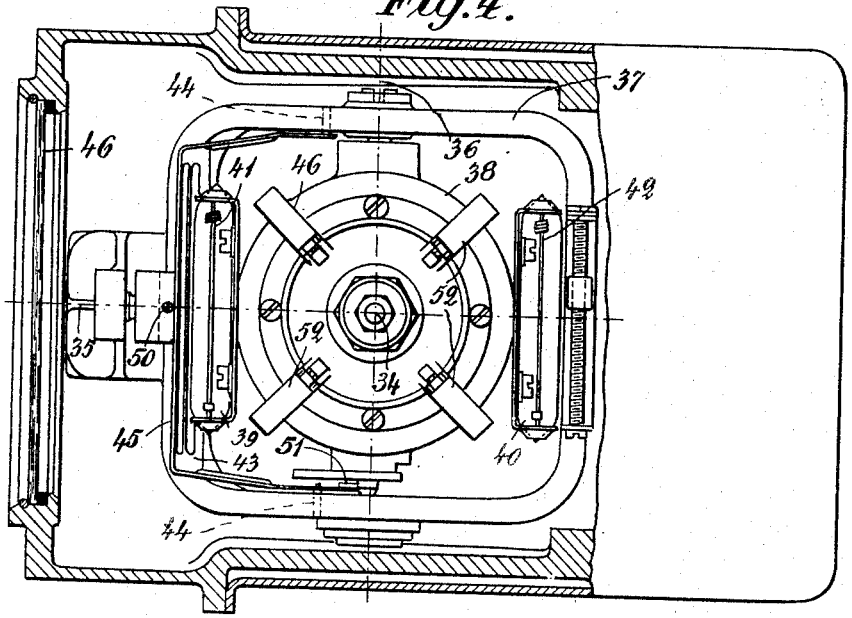

Figs. 1 and 2 show schematically a side elevation of two different embodiments, while Figs. 3 and 4 illustrate a side elevation and a plan view respectively of another embodiment.

In Figs. 1 and 2, 1 and 1¹ indicate two supports of the instrument stand, which together with the visor disc 2 is rigidly fixed to the airplane. In both embodiments it is supposed that the outer Cardan ring 3 is journaled with its turning axis 4 in the longitudinal direction of the airplane and that the inner Cardan ring 5, which is constituted as a rotor housing, is journaled with its turning axis 6 in the transverse direction of the airplane.

The invention may, however, be used also with gyro horizons in which the turning axis of the outer Cardan ring is placed in the transverse direction of the airplane and that of the inner Cardan ring in the longitudinal direction of the airplane.

In the inner Cardan ring 5 a gyro rotor is journaled, the axis 7 of which is held vertically orientated during operation by means of a suitable erecting arrangement. Such an arrangement, which is known per se, is indicated by the pendulums 8, which, when the rotor axis 7 is not in vertical position, open and shut air outlet openings in the rotor housing in such a manner that the rotor axis 7 is brought to the vertical position by means of the reaction force of the escaping air. If a pneumatically operated rotor is used, the propelling air may also be utilized to produce the said reaction force and if, the gyro rotor is driven electrically, the required flow of air may be produced by means of fan blades on the rotor.

In the embodiment according to Fig. 1, at the upper side as well as at the lower side of the outer Cardan ring 3 in the neighbourhood of the support 1, there are electric lamps 22 and 22¹ respectively with appertaining reflectors 23 and 23¹ respectively and screens 24 and 24¹ respectively which, each being provided with a slit, are arranged in such a manner that a light band is thrown forwards parallel to the axis 4 of the outer Cardan ring 3. At the back and front sides of the inner Cardan ring 5, and supported from it, there are located convex cylindric mirrors 25 and 26 respectively, the axes of which, being placed horizontally and parallel to the axis 6 of the inner Cardan ring 5, are so arranged that the mirror 25 throws obliquely upwards the light band of the lamp 22. If the airplane turns 180° about its longitudinal as well as its transverse axis, then the mirror 26 throws back obliquely upwards the light band of the lamp 22, whereby the light band hits a concave-cylindric mirror 27. The mirrors 27 and 28 are arranged respectively above and below the axis 4 of the outer Cardan ring 3. The mirrors 27 and 28 are supported from the outer Cardan ring 3 with their axes horizontal and parallel to the axis 6 of the inner Cardan ring 5, and from the mirror 27 or 28, whichever happens to be uppermost, the light band will be thrown back on the visor disc 2. When the airplane is rising, all the parts connected with the airplane will turn counterclockwise together with the outer Cardan ring from the position shown in Fig. 1, which will influence the moving of the ray of light in the same way as if the inner Cardan ring 5 were turned clockwise.

Thus it is that by suitable choice of radii and mirror distances the ray of light will always hit the visor disc below the horizontal longitudinal axis of the airplane.

The reflector 23 as well as the reflector 23¹ is provided with openings 29 and 29¹ respectively directed backwards, through which a light spot is thrown on the uppermost part of the visor disc 2 from whichever of the lamps 22 or 22¹ happens to be uppermost. This light spot serves to indicate the side inclination of the airplane.

If each of the lamps 22 and 22¹ is provided with a straight horizontal glow-lamp filament, then the screens 24 and 24¹ need not be used and the glow-lamp filament instead of the slit of the screens 24 and 24¹ will be reproduced on the visor disc.

In the embodiment according to Fig. 2 there is a lamp 30 with appertaining reflector 31 and a screen 32, which is provided with a slit. The lamp 30 is arranged at the upper side of the inner Cardan ring 5 on the end that is facing the visor disc 2, so as to lie between the rotor axis 7 and the visor disc 2. Another lamp 30¹ equipped in the same manner, i. e. with reflector 31¹ and slit-screen 32¹, is placed at the opposite upper side of the inner Cardan ring 5. The slits of the screens 32 and 32¹ are horizontal and parallel to the axis 6 of the inner Cardan ring 5. To the outer Cardan ring 3 are fixed two concave-cylindric mirrors 33 and 33¹, which are arranged symmetrically to the axis 4 of the outer Cardan ring 3 and above and below the axis 4. The axes of the mirrors 33 and 33¹ are horizontal and parallel to the axis 6 of the inner Cardan ring 5.

The light band from slit 32 hits the mirror 33 and is thrown back from this on the visor disc 2, while the lamp 30¹ and the mirror 33¹ after turning of the airplane 180° about the longitudinal axis as well as the transverse one will become effective to supply the indication. The radii and distances of the mirrors are also in this arrangement so chosen that the horizon-indicating picture moves downwards with increase of upward pitch of the airplane.

In Figures 3 and 4 the numeral 34 indicates the axis of the rotor. The rotor is operated by means of an electric motor. The numerals 35 and 36 indicate the turning axes of the outer Cardan ring 37 and the inner Cardan ring 38 respectively. The outer Cardan ring 37 is, at the side that is facing the pilot, bent downwards (part 37¹). On the front as well as on the back side of the inner Cardan ring 38 there are mounted electric lamps 39 and 40 respectively, which are provided with straight or spiral wound glow-lamp filaments 41 and 42 respectively, each of which has a small outer diameter. The middle lines of the two glow-lamp filaments are parallel to the turning axis 36 and are placed in the same plane as the two turning axes 35 and 36 in the position shown in Fig. 3.

A screen 43 which has the smallest possible weight is swingably journaled about the pins 44 on the outer Cardan ring 37, whereby the turning axis of the screen 43 is parallel to the turning axis 36.

The upper edge 45 of the screen 43 coacts with the glow-lamp filament 41 in such a manner that in the horizontal normal position of the airplane shown in Fig. 3 the visor disc 46 is divided by the screen 43 into two equally large fields, an upper illuminated one and a lower one not illuminated, whereby the line of separation between these two fields simulates the horizon. During climbing of the airplane all the parts that are rigidly connected to the airplane are turned counter-clockwise in Fig. 3 as well as the outer Cardan ring 37, which influences the moving of the beam of the lamp 39 in the same manner as if the inner Cardan ring 38 together with the lamp 39 were turned clockwise, i. e. as if upon climbing of the airplane at an angle of 30° the lamp 39 would come into the position indicated by 39¹ in which the whole visor disc 46 is light. On the other hand, when the airplane is diving all the parts which are rigidly connected to the airplane as well as the outer Cardan ring 37 are turned clockwise, which influences the range of illumination of the lamp 39 in the same manner as if the inner Cardan ring 38 together with the lamp 39 were turned counter-clockwise. For example, if the airplane were to dive at an angle of 30°, the lamp would come into a position as indicated by 39'', under which conditions the whole visor disc 46 is dark.

If the airplane is turned about its longitudinal axis, the rotor axis 34 will remain in vertical and the lamp 39 and the upper edge 45 of the screen 43 in horizontal position, while the visor disc 46 is turned. Due to this fact, the said line of separation will show on the visor disc 46 the inclination of the airplane.

The screen 43 is provided at its lower edge 47 with a stop 48 abutting against a screw 49 screwed into the downwards bent part 37¹ of the Cardan ring which limits the movement downwards of the screen 43 and permits an adjustment of the upper screen edge 45 in the horizontal plane shown in Fig. 3, in which the glow-lamp filament 41 and 42 are located so that the illuminated and the non-illuminated field on the visor disc 46 will be equally large.

If the airplane makes a turn of 180° about the transverse axis, the lamp 40 becomes effective to supply the indication. Thus the glow-lamp filament 42 acts together with the screen edge 47 in the same manner as the glow-lamp filament 41 with the screen edge 45. This is because the edge 47, by turning of the screen 43 about the pins 44 and abutting of the stop 48 against a second adjusting screw 50 screwed into the downwards bent part 37$^1$ of the Cardan ring, has come to the horizontal plane in which the glow-lamp filaments 41 and 42 are placed. In the horizontal position of the airplane, after a turn of 180° about the transverse axis the visor disc 46 is separated into two equally large fields, one upper illuminated one and one lower one not illuminated, while upon ascent or descent of the airplane at an angle of 30° the whole visor disc 46 is light or dark respectively (compare the positions of the lamp 39 indicated by 39$^1$ and 39'' with the corresponding positions 40$^1$ and 40'' of the lamp 40).

If now the airplane makes a turn of 180° about the longitudinal axis, the glow-lamp filament 42 acts together with the screen edge 47 in the same manner as described.

With 51 there is indicated a counterweight, which is mounted on an extension to the other side of a pivot pin 44 of one of the support arms of screen 43. This counterweight partly balances the screen 43. A complete balancing of the screen 43 has, however, to be avoided as the screen 43 in that case would not function, i. e. would not automatically perform the required turning about the pins 44 at the turning of the airplane about the transverse axis. The incomplete balancing of the screen 43 produces evidently a certain unbalance of weight of the outer Cardan ring 37 in one or in both end positions of the screen 43. This unbalance of weight may, however, be kept so small that the same is of no practical importance and possibly can be partly compensated by a corresponding unbalance of weight of the inner Cardan ring 38.

While this invention has been described with respect to several embodiments thereof, it will be noted that these embodiments have in common the feature that the inner and outer rings both carry elements of an optical system for transmitting light to a disc. Furthermore, the elements of the optical system which are located on each ring are duplicated on opposite sides of the axis of that ring so that 180° displacement of either or both rings about the respective axes will not interfere with the operation of the instrument.

Having now particularly described the nature of our invention and the manner of its operation what we claim is:

1. A gyro horizon instrument comprising a fixed viewing screen, a pair of Cardan rings, a gyro rotor supported on the inner ring, means constituting a light source on one of said rings, light modifying means on the other of said rings in the light path between said source and said screen, a portion of the means on the inner ring lying outside the axis of the inner ring, said portion being duplicated at opposite sides of the respective ring axes to render the instrument useable after marked change in a direction of the aircraft without resort to caging.

2. An instrument as claimed in claim 1 wherein the light modifying means comprises an opaque screen mounted on the outer ring for limited swinging movement about an axis parallel to the axis of the inner ring.

3. An instrument as claimed in claim 1 wherein the light modifying means comprises an opaque screen mounted on the outer ring for limited swinging movement about an axis parallel to the axis of the inner ring, and said instrument comprising means to counterbalance said inner ring to offset the effect of the opaque screen on the outer ring.

4. An instrument as claimed in claim 1 wherein the light modifying means comprises an opaque screen mounted on the outer ring for swinging movement about an axis parallel to the axis of the inner ring, and wherein two adjustable stops are mounted on the outer ring for limiting the swinging movement of the opaque screen.

5. An instrument as claimed in claim 1 wherein the means constituting the light source comprises a pair of light sources disposed on the inner ring 180° apart, and wherein the light modifying means comprises an opaque screen mounted on the outer ring for limited swinging movement about an axis parallel to the axis of the inner ring.

6. An instrument as claimed in claim 1 wherein the means constituting the light source comprises a pair of long filament lamps disposed on the inner ring 180° apart with the filaments parallel to the inner ring axis, and wherein the light modifying means comprises an opaque screen mounted on the outer ring for swinging movement about an axis parallel to the axis of the inner ring, and stops on said outer ring for limiting the swinging movement of the opaque screen.

7. An instrument as claimed in claim 6 wherein said lamp filaments, the edge of said opaque screen, and the axes of said rings all lie in a single horizontal plane when the aircraft is in horizontal flight.

SVEN GUNNAR SVENSSON.
ROLF BERTIL PERSON.
NILS BÖRJE LANGEFORS.

REFERENCES CITED

The following references are of record in the file of this patent:

UNITED STATES PATENTS

| Number | Name | Date |
| --- | --- | --- |
| 1,988,591 | Gillmor | Jan. 22, 1935 |
| 2,044,150 | Carlson | June 16, 1936 |
| 2,366,721 | Gabrielson | Jan. 9, 1945 |

FOREIGN PATENTS

| Number | Country | Date |
| --- | --- | --- |
| 16,996 | Great Britain | Aug. 12, 1908 |
| 501,275 | France | Jan. 21, 1920 |
| 760,535 | France | Dec. 14, 1933 |
| 821,650 | France | Aug. 30, 1937 |

OTHER REFERENCES

Postelethwaite: "An Italian Artificial Horizon," Aircraft Engineering, 1944, pages 288 and 289.